(12) United States Patent
Lee et al.

(10) Patent No.: US 10,377,403 B2
(45) Date of Patent: Aug. 13, 2019

(54) POWERED UTILITY CART AND COMPLIANT DRIVE WHEEL THEREFOR

(71) Applicant: Caster Concepts, Inc., Albion, MI (US)

(72) Inventors: Elmer Lee, Canton, MI (US); Alex Harden, Albion, MI (US)

(73) Assignee: Caster Concepts, Inc., Albion, MI (US)

( * ) Notice: Subject to any disclaimer, the term of this patent is extended or adjusted under 35 U.S.C. 154(b) by 0 days.

(21) Appl. No.: 15/342,191

(22) Filed: Nov. 3, 2016

(65) Prior Publication Data

US 2017/0129522 A1 May 11, 2017

Related U.S. Application Data

(60) Provisional application No. 62/252,173, filed on Nov. 6, 2015, provisional application No. 62/337,447, filed on May 17, 2016.

(51) Int. Cl.
| | |
|---|---|
| *B62B 5/00* | (2006.01) |
| *B60K 1/04* | (2019.01) |
| *B60K 7/00* | (2006.01) |
| *B60K 17/04* | (2006.01) |
| *B62B 5/06* | (2006.01) |

(52) U.S. Cl.
CPC .............. *B62B 5/0043* (2013.01); *B60K 1/04* (2013.01); *B60K 7/0007* (2013.01); *B60K 17/043* (2013.01); *B62B 5/0053* (2013.01); *B62B 5/0056* (2013.01); *B62B 5/06* (2013.01); *B60K 2001/0438* (2013.01); *B60K 2007/0038* (2013.01); *B60K 2007/0069* (2013.01); *B60Y 2200/62* (2013.01); *B60Y 2200/86* (2013.01);
(Continued)

(58) Field of Classification Search
CPC ...... B62B 5/0043; B62B 2206/06; B60K 1/00
See application file for complete search history.

(56) References Cited

U.S. PATENT DOCUMENTS

| | | |
|---|---|---|
| 2,706,008 A | 4/1955 | Voigt |
| 2,779,425 A | 1/1957 | Miller |

(Continued)

FOREIGN PATENT DOCUMENTS

GB 2156291 A 10/1985

*Primary Examiner* — Joseph M Rocca
*Assistant Examiner* — Michael R Stabley
(74) *Attorney, Agent, or Firm* — Endurance Law Group PLC

(57) ABSTRACT

A lift-enabled motorized wheel assembly and material handling cart. A drive wheel is supported on an axel between a fixed leg and a floating leg. The axel passes through the fixed leg without interference, but is captured in the floating leg by a self-aligning bearing. The axle is driven by a drive motor that is bolted to the fixed leg through a right-angle gearbox. A vertical suspension unit provides compliance for drive wheel traction. A lifter sub-assembly alternately raises and lowers the drive wheel into and out of contact with the ground. The lift-enabled motorized wheel assembly is attached to the bottom of a cart frame, along with a plurality of caster wheels. The cart includes a tow-bar that is moveable between raised and lowered positions. When the tow-bar is lowered condition for towing, the drive wheel automatically lifts out of contact with the ground.

8 Claims, 13 Drawing Sheets

(52) U.S. Cl.
CPC ..... *B60Y 2200/91* (2013.01); *B62B 2205/104* (2013.01)

(56) References Cited

U.S. PATENT DOCUMENTS

| | | | |
|---|---|---|---|
| 3,380,546 A | 4/1968 | Rabjohn | |
| 3,613,813 A | 10/1971 | Biddle | |
| 3,779,328 A | 12/1973 | Wollenburg | |
| 3,901,337 A | 8/1975 | Cragg | |
| 3,912,037 A | 10/1975 | Krieg | |
| 3,930,551 A | 1/1976 | Cragg | |
| 4,019,597 A | 4/1977 | Carmichael | |
| 4,125,169 A | 11/1978 | Harris et al. | |
| 4,671,524 A | 6/1987 | Haubenwallner | |
| 4,759,418 A | 7/1988 | Goldenfeld et al. | |
| 4,778,024 A | 10/1988 | Matsumoto et al. | |
| 5,113,959 A | 5/1992 | Mastov et al. | |
| 5,222,567 A | 6/1993 | Broadhead et al. | |
| 5,495,904 A | 3/1996 | Zwaan et al. | |
| 5,547,038 A | 8/1996 | Madwed | |
| 5,558,174 A | 9/1996 | Avitan et al. | |
| 5,575,348 A | 11/1996 | Goertzen et al. | |
| 5,853,059 A * | 12/1998 | Goertzen | A61G 5/045 180/65.6 |
| 6,000,486 A | 12/1999 | Romick et al. | |
| 6,098,732 A | 8/2000 | Romick et al. | |
| 6,100,615 A | 8/2000 | Birkestrand | |
| 6,286,165 B1 * | 9/2001 | Heimbrock | A61G 1/0225 280/43.17 |
| 6,341,657 B1 | 1/2002 | Hopely et al. | |
| 6,345,678 B1 | 2/2002 | Chang | |
| 6,355,996 B1 | 3/2002 | Birkestrand | |
| 6,491,127 B1 | 12/2002 | Holmberg et al. | |
| 6,702,051 B2 | 3/2004 | Chu et al. | |
| 6,725,956 B1 * | 4/2004 | Lemire | A61G 7/08 180/15 |
| 6,729,422 B2 | 5/2004 | Chu et al. | |
| 6,792,630 B1 * | 9/2004 | Palmatier | A61G 7/012 280/43.17 |
| 6,877,572 B2 * | 4/2005 | Vogel | A61G 7/00 180/15 |
| 6,902,019 B2 * | 6/2005 | Heimbrock | A61G 7/018 180/19.1 |
| 7,011,172 B2 * | 3/2006 | Heimbrock | A61G 7/018 180/19.1 |
| 7,083,012 B2 * | 8/2006 | Vogel | A61G 7/00 180/15 |
| 7,090,041 B2 * | 8/2006 | Vogel | A61G 7/00 180/15 |
| 7,191,854 B2 | 3/2007 | Lenkman | |
| 7,328,761 B1 | 2/2008 | Tyler | |
| 7,419,019 B1 * | 9/2008 | White | A61G 7/08 180/19.1 |
| 7,480,948 B2 * | 1/2009 | Reinke | B60B 33/0021 5/601 |
| 7,621,360 B2 | 11/2009 | Stubner et al. | |
| 7,658,247 B2 | 2/2010 | Carter | |
| 7,882,582 B2 * | 2/2011 | Kappeler | A61G 7/018 5/510 |
| 7,886,377 B2 * | 2/2011 | Hamberg | A61G 7/0528 5/600 |
| 7,975,790 B2 | 7/2011 | Kim et al. | |
| 8,109,525 B2 * | 2/2012 | Salus | A61G 7/08 180/209 |
| 8,240,410 B2 * | 8/2012 | Heimbrock | A61G 7/018 180/19.1 |
| 8,474,073 B2 * | 7/2013 | Hamberg | A61G 7/0528 5/600 |
| 8,662,217 B2 * | 3/2014 | Block | A61G 7/08 180/15 |
| 8,746,710 B2 * | 6/2014 | Schejbal | A61G 7/018 280/43 |
| 8,820,447 B2 | 9/2014 | Carter et al. | |
| 8,978,795 B2 * | 3/2015 | Block | A61G 7/08 180/15 |
| 8,983,740 B2 | 3/2015 | Eidelson | |
| 9,358,169 B2 * | 6/2016 | Ottenweller | A61G 7/08 |
| 9,656,700 B2 | 5/2017 | Eidelson | |
| 2006/0042841 A1 | 3/2006 | Russell | |
| 2009/0242284 A1 | 10/2009 | Whetstone | |
| 2017/0253283 A1 | 9/2017 | Eidelson | |

* cited by examiner

POWERED UTILITY CART AND COMPLIANT DRIVE WHEEL THEREFOR

CROSS REFERENCE TO RELATED APPLICATIONS

This application claims priority to Provisional Patent Application No. 62/252,173 filed Nov. 6, 2015, and to Provisional Patent Application No. 62/337,447 filed May 17, 2016, the entire disclosures of which are hereby incorporated by reference and relied upon.

BACKGROUND OF THE INVENTION

Field of the Invention

The invention relates generally to motorized carts of the type used in industrial material handling, and more particularly to electric drive wheels therefor.

Description of Related Art

Sturdy wheeled carts are commonly used in factories and other industrial settings to transport heavy industrial materials from one location to another. Often, the wheeled cart is pulled by a motorized vehicle (e.g., a forklift, tugger, tractor, etc.), especially when larger distances must be traversed. It is not uncommon to connect multiple carts in series, akin to train cars, so that they can be simultaneously tugged in convoy by the motorized vehicle. When the wheeled cart arrives near its destination, which may for example be a manufacturing machine or a storage area, a worker is often required to manually maneuver the wheeled cart a short distance to locate the cart in an optimal resting position. In these situations, a worker's muscular strength is required to move the cart. Because of the very heavy weights carried by the carts, sometimes more than 6,000 pounds, there has been concern about possible injury to workers and to surrounding objects caused by the manual efforts required. Considering the often very large inertia values, the typically repetitive acts of starting, turning and stopping a heavily-loaded cart can inflict damage to the worker's muscles, joints and/or nerves.

To reduce the potential for worker injuries and collateral property damage, the prior art has suggested with limited success to equip a cart with one or more electric motorized wheels. See for one example U.S. Pat. No. 3,380,546 to Rabjohn which discloses an industrial utility cart designed for both self-propelled and manually maneuvered operation. However, the prior art electric carts have several drawbacks. They are notoriously difficult to operate. They are usually not able to be towed by a motorized vehicle, and if they are towing-enabled it is usually difficult or impossible for a worker to disengage the electric drive wheel(s) for towing. Furthermore, the prior art electric carts must be retired for a period every day to re-charge their batteries. While recharging, the cart is not available for useful service.

There is therefore a need for an improved motorized cart for use in factories and other industrial settings to transport heavy industrial materials from one location to another, that is towable, and that does not require long periods of inactive rest for re-charging.

Moreover, there is a need for an improved motorized drive wheel sub-assembly that can be retro-fitted to an existing wheeled cart, and that is low cost yet robust in performance. And furthermore, there is a need for an improved motorized drive wheel sub-assembly that can be configured to lift its drive wheel above the ground for times when the motorized function is not required.

BRIEF SUMMARY OF THE INVENTION

According to a first aspect of this invention, a motorized wheel assembly for a material handling cart is provided. The assembly comprises a mounting plate. A pair of legs extend perpendicularly from the mounting plate. The pair of legs comprises a fixed leg and a floating leg spaced laterally apart from one another. The fixed and floating legs each have respective captured ends that are aligned with one another and pivotally connected about a common pivot axis to the mounting plate. The fixed and floating legs each also have respective compliant ends that are aligned with one another and pivotally connected about a common suspension axis. An axle perpendicularly intersects the fixed and floating legs generally mid-way between their respective captured and compliant ends. The axle is supported for rotation relative to the mounting plate about a longitudinal axis thereof. A drive wheel is disposed on the axle in-between the fixed and floating legs for locked rotation with the axle about the longitudinal axis. A gearbox is rigidly attached to the fixed leg. A right-angle gear train is operatively disposed inside the gearbox. The right-angle gear train runs a hollow output shaft that is disposed at least partially in the gearbox and supported therein by at least one fixed bearing. The axle is operatively disposed inside the hollow shaft for synchronous co-rotation. A drive motor is attached to the gearbox and is operatively coupled with the right-angle gear train to drive the axle in powered rotation. A vertical suspension unit is operatively disposed between the mounting plate and the aligned compliant ends of the fixed and floating legs.

According to a second aspect of this invention, a lift-enabled motorized wheel assembly for a material handling cart is provided. The assembly comprises a mounting plate and a pair of legs extending perpendicularly therefrom. Each has leg has a generally identical V-shaped configuration defined by splayed tips converging toward a central knee. The splayed tips comprise, respectively, captured and compliant ends. The captured ends are aligned with one another and pivotally connected about a common pivot axis to the mounting plate. Similarly, the compliant ends are aligned with one another and pivotally connected about a common suspension axis. An axle perpendicularly intersects the legs adjacent the respective central knees generally mid-way between the respective captured and compliant ends. The axle is supported for rotation relative to the mounting plate about a generally horizontal longitudinal axis. A drive wheel is disposed on the axle in-between the legs for locked rotation with the axle about the longitudinal axis. A drive motor is operatively coupled to the axle for co-rotating the axle and the drive wheel about the longitudinal axis. A lifter sub-assembly is operatively disposed between the mounting plate and one of the captured and compliant ends of the legs. The lifter sub-assembly includes an actuator moveable between extended and retracted positions. The drive wheel is pressed into contact with the ground when the actuator is in the extended position, and the drive wheel is lifted out of contact with the ground when the actuator is in the retracted position. The actuator has a distal end, to which upper and lower links are pivotally attached. The upper link is also pivotally attached to the mounting plate, whereas the lower link is pivotally attached to the captured ends of the legs. The upper and lower links form a generally vertical load-bearing column when the actuator is in the extended position.

According to a third aspect of this invention, a powered utility cart assembly is provided. The assembly is comprised of a cart frame. The cart frame has a platform to which a plurality of caster wheels are attached. The plurality of caster wheels includes at least two non-steerable caster wheels which are co-axially aligned with one another. A tow-bar is operatively attached to the platform so as to be moveable between raised and lowered positions. A motorized wheel sub-assembly is attached to the platform. The motorized wheel sub-assembly includes a drive wheel that is disposed for rotation about a generally horizontal longitudinal axis. The drive wheel is located generally equidistant between the two non-steerable caster wheels and generally coaxially aligned therewith. A lifter sub-assembly is operatively disposed between the platform and the drive wheel. The lifter sub-assembly includes an actuator moveable between extended and retracted positions. The drive wheel is pressed into contact with the ground when the actuator is in the extended position, and the drive wheel is lifted out of contact with the ground when the actuator is in the retracted position. A tow bar switch is responsive to movement of the tow-bar to automatically cause the actuator to move to its retracted position when the tow-bar is in the lowered position. However, when the tow-bar is in the raised position, the actuator is free to move between its extended and retracted positions at the will of the operator.

Among these several aspects of the invention, there is provided an improved motorized drive wheel sub-assembly that can be retro-fitted to an existing wheeled cart, and that is low cost yet robust in performance. There is an improved motorized drive wheel sub-assembly that can be configured to lift its drive wheel above the ground when a motorized function is not required. And there is an improved motorized cart for use in factories and other industrial settings to transport heavy industrial materials from one location to another, that is towable, and that does not require long periods of inactive rest for re-charging.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views, the present invention is described in terms of sub-assemblies that can be used either independently or in combination. The sub-assemblies include a motorized wheel sub-assembly, generally indicated at 16 and featured in FIGS. 1-3, a lifter sub-assembly, generally indicated at 18 and featured in FIGS. 4-8, and a cart frame, generally indicated at 20 and featured in FIGS. 9-13. To reiterate, each sub-assembly 16-20 is independent, in the sense that each could be deployed without incorporating the features of the other sub-assemblies. However, the several aspects of this invention are described in a progressive manner: the motorized wheel sub-assembly 16 is described first, followed by the lifter sub-assembly 18 which is implemented (optionally) within the context of the motorized wheel sub-assembly 16, and then the cart frame 20 is described within the context of the preferred lifter sub-assembly 18 as fitted to the motorized wheel sub-assembly 16.

Figure 1:
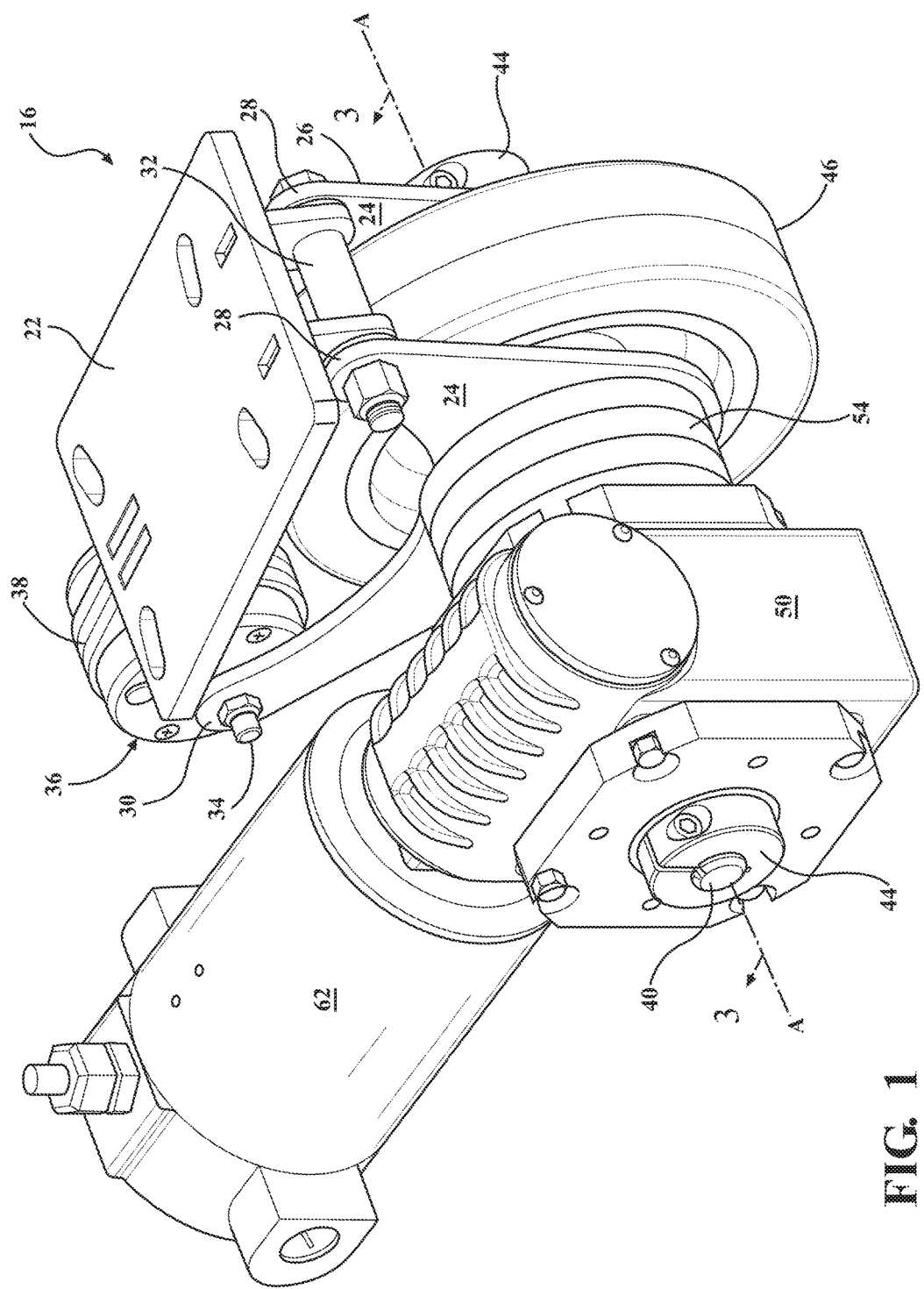
FIG. 1 is a perspective view of a motorized wheel sub-assembly according to a first aspect of the present invention.
Figure 2:
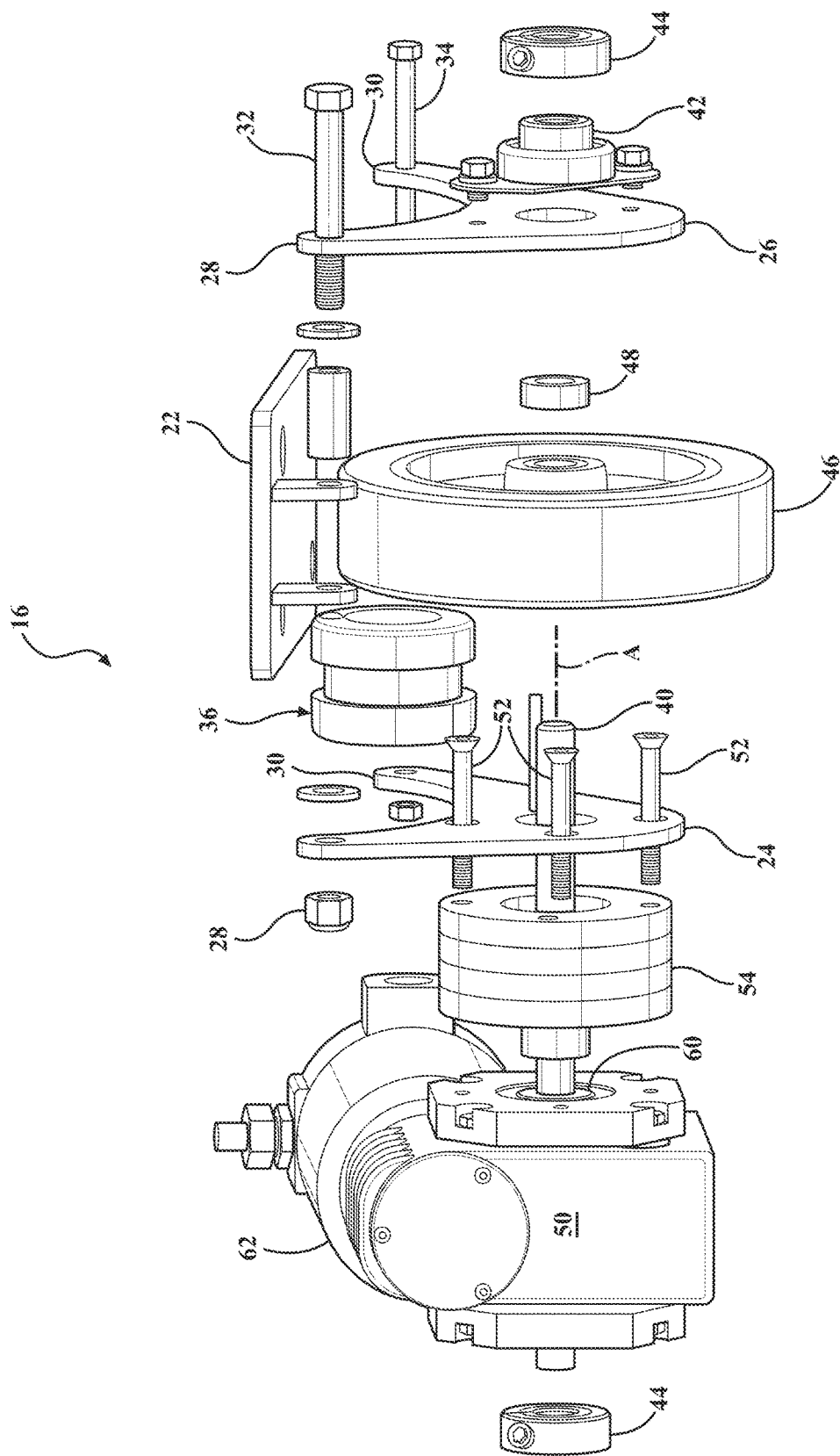
FIG. 2 is an exploded view of the motorized wheel sub-assembly.
Figure 3:
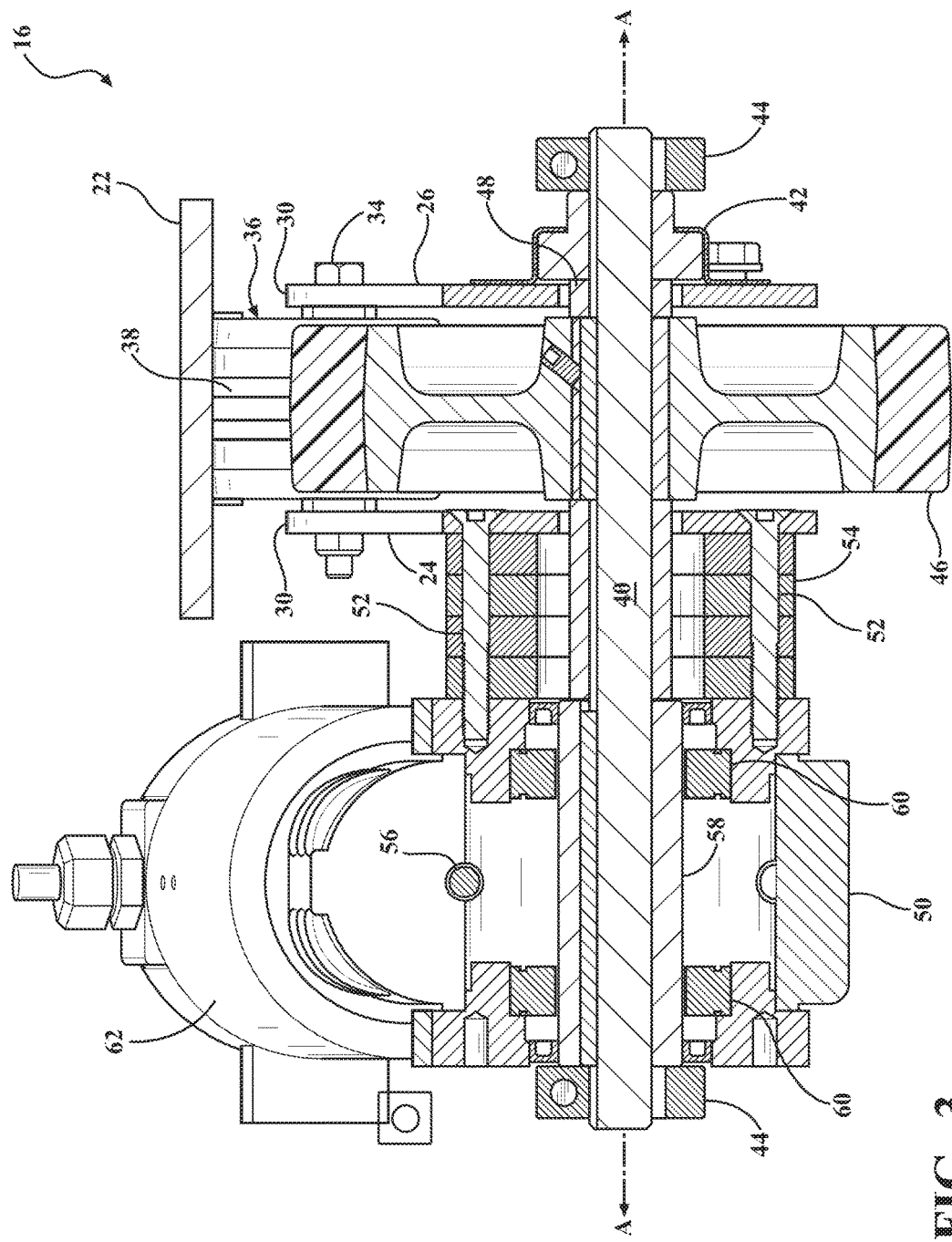
FIG. 3 is a cross-section view through the longitudinal axis A as indicated along lines 3-3 in FIG. 1.
Figure 4:
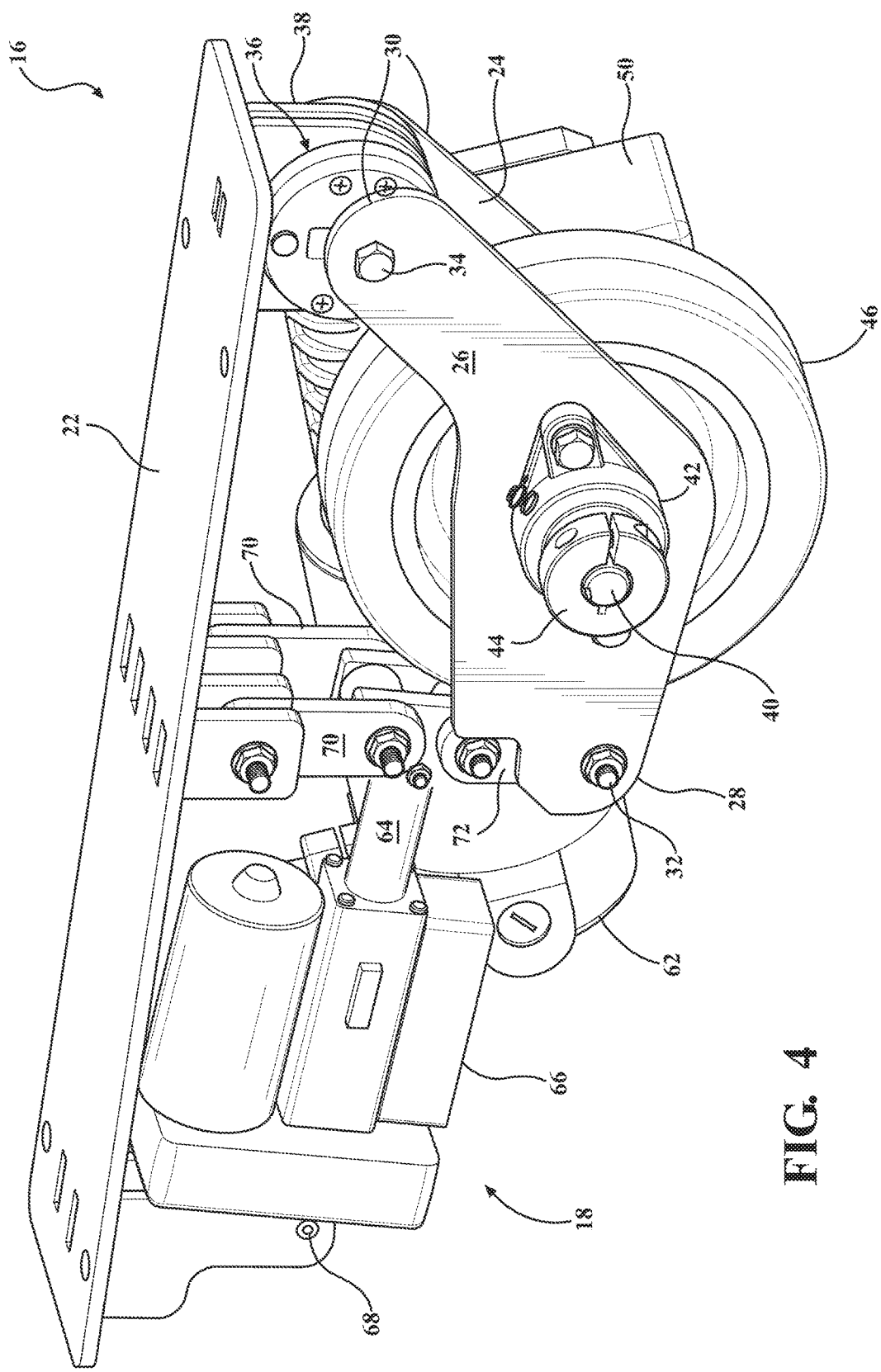
FIG. 4 is a perspective view of a combined motorized wheel sub-assembly as in FIG. 1 and a lifter sub-assembly according to a second aspect of the present invention.
Figure 5:
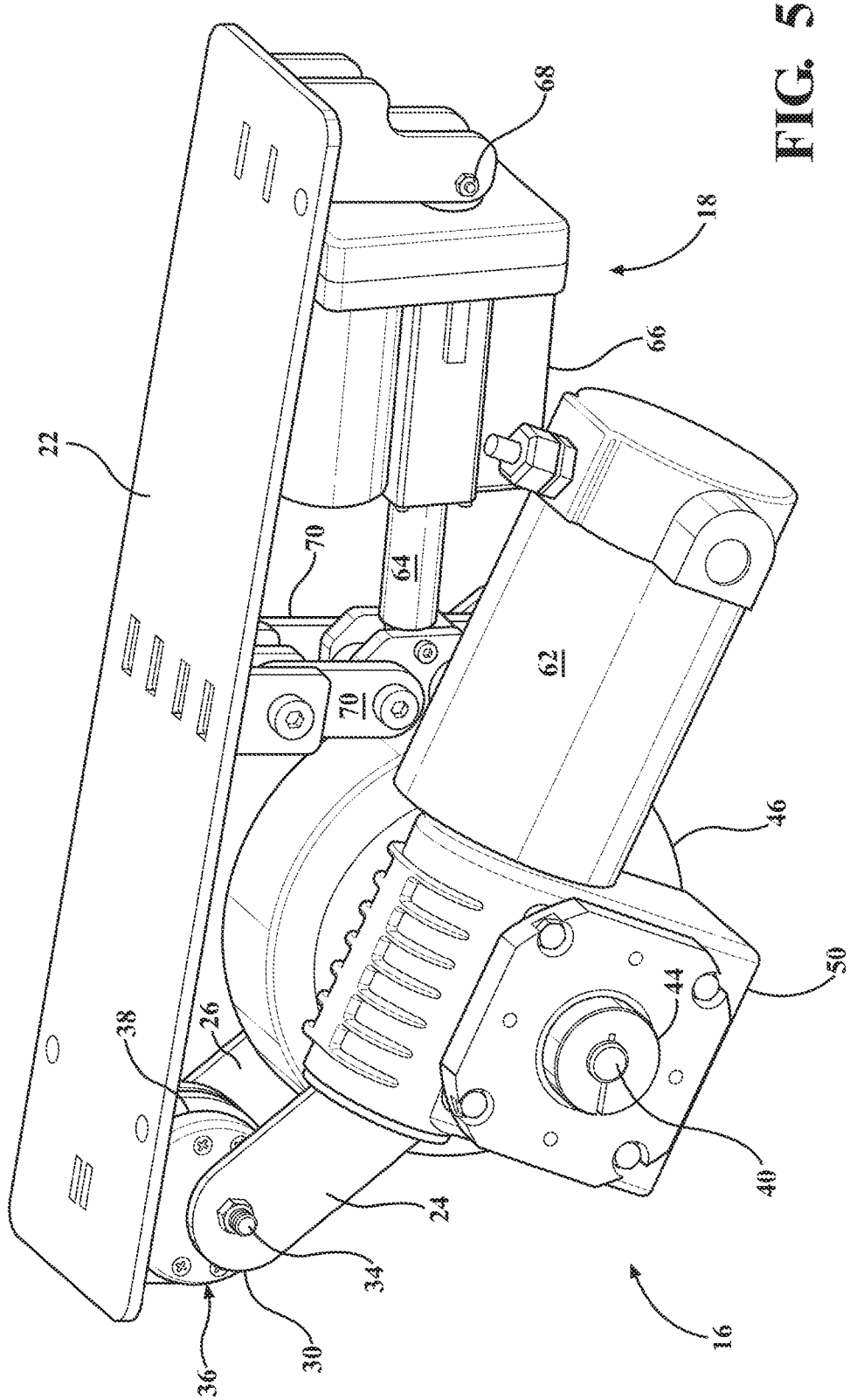
FIG. 5 is another perspective view of assembly depicted in FIG. 4.
Figure 6:
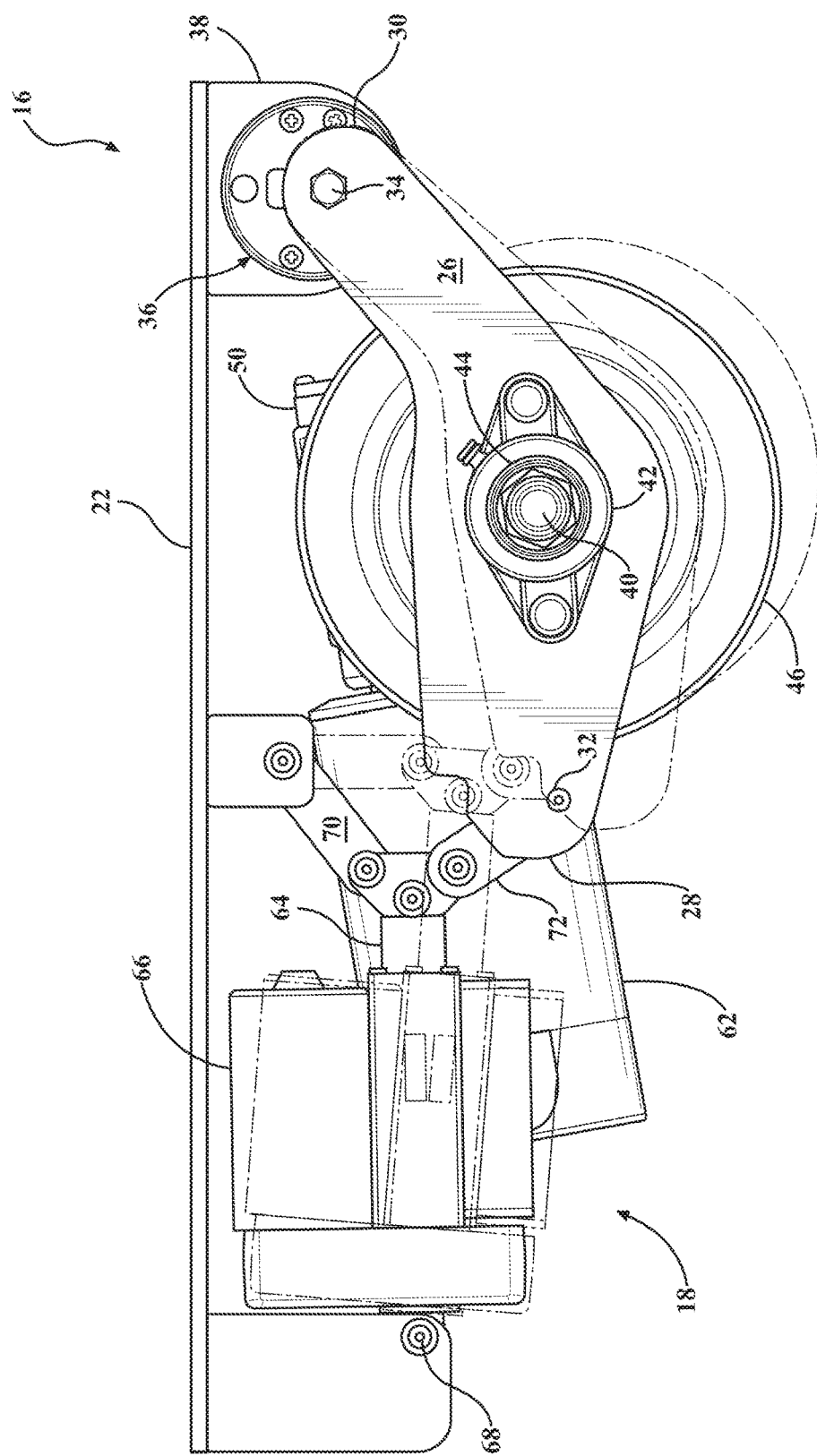
FIG. 6 is a side elevation view of the assembly depicted in FIG. 4, with the drive wheel shown raised in solid lines and lowered in phantom lines.
Figure 7:
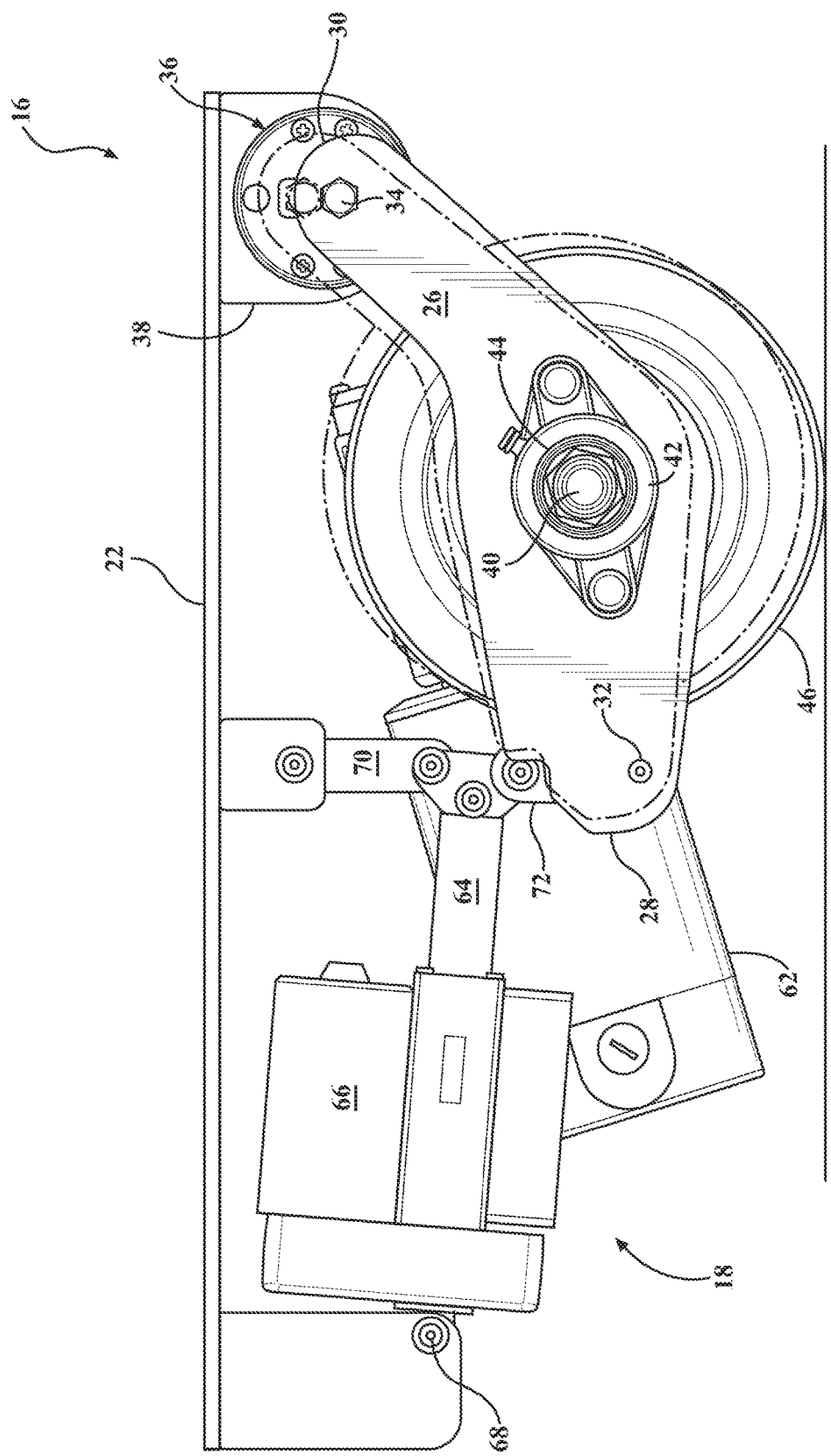
FIG. 7 is a side view as in FIG. 6 but showing the drive wheel in its lowered condition with shifting due to compliance deflection per the vertical suspension unit in phantom lines.
Figure 8:
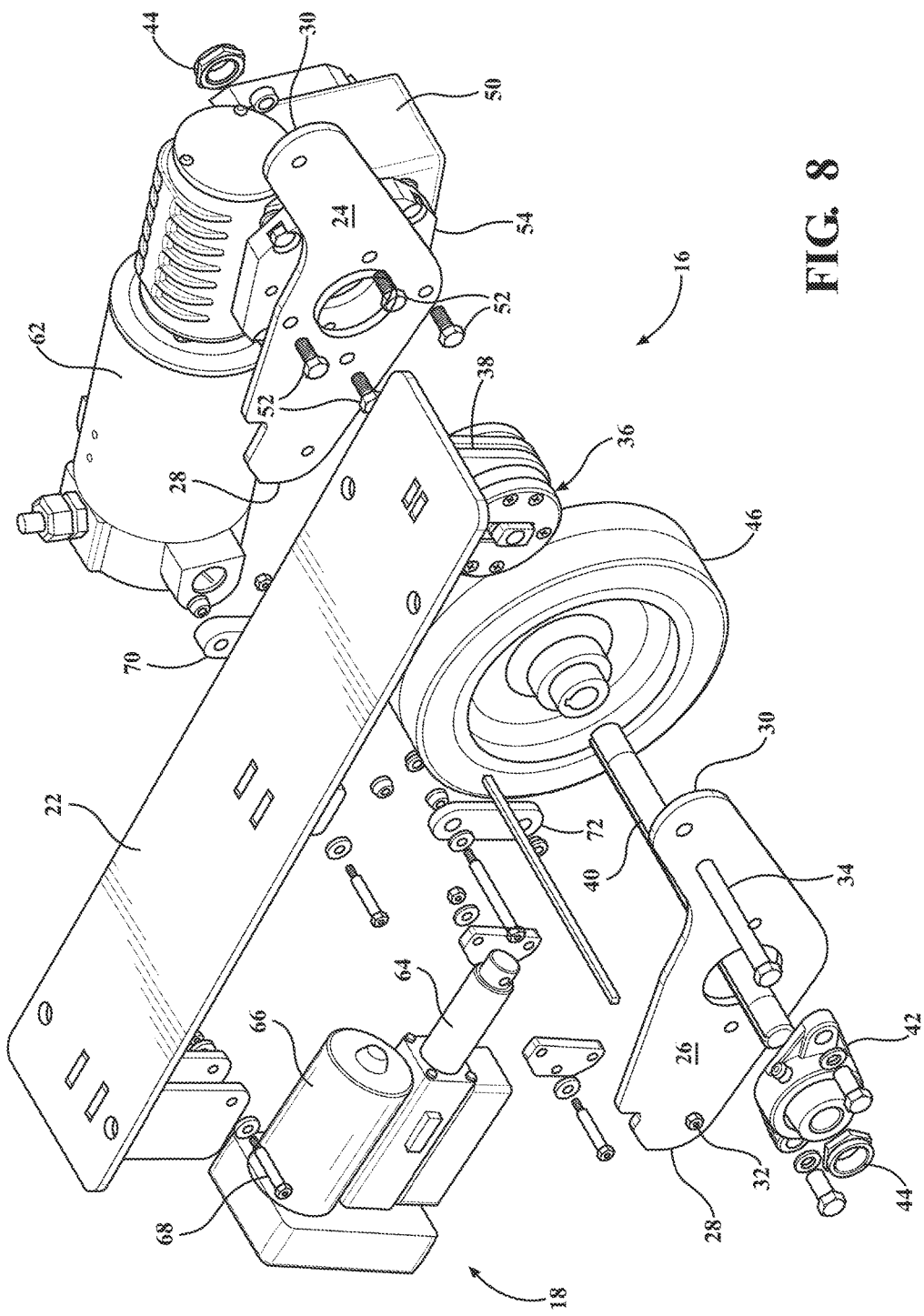
FIG. 8 is an exploded view of the assembly depicted in FIGS. 4-7.

Turning first to FIGS. 1-3, the motorized wheel sub-assembly 16 is shown in considerable detail. A mounting plate 22 is used to securely attach the motorized wheel sub-assembly 16 to any of various objects. The mounting plate 22 is shown as a sturdy rectangular structure with various holes for attachment. Of course, the mounting plate 22 can take many different configurations to fit to the intended application. For example, in one common application, the mounting plate is designed to replicate the size and hole patterns of a common caster wheel such as found on the average industrial utility push-cart. Examples of such common caster wheels may be found throughout the industry, including but not limited to the ErgoMaxx™ and Twergo® product lines offered by Caster Concepts, Inc. of Albion, Mich., the assignee of this present invention. In this manner, the common caster wheel (not shown) could be replaced in a retro-fitting operation with the motorized wheel sub-assembly 16 to motorize a previously manually moved push-cart. In another contemplated application, the mounting plate 22 is attached directly to a tiller arm which is then attached to a utility cart through a swivel plate. An example of this latter application may be observed by reference to the Conversion Drive Caster product offered by Caster Concepts, Inc. of Albion, Mich. By attaching the motorized wheel sub-assembly 16 to a tiller arm in this manner, a high level of steering control is made possible. A still further contemplated application is described below in connection with the cart frame 20 of FIGS. 9-13. Indeed, many more applications for the motorized wheel sub-assembly 16 are possible, with these mentioned representing only a few examples.

Returning to FIGS. 1-3, a pair of rigid plate-like legs 24, 26 are shown extending perpendicularly from the mounting plate 22. The legs 24, 26, which may be designated as a fixed leg 24 and a floating leg 26, are spaced apart from one another by a suitable distance. Both legs 24, 26 may be substantially identical to one another, or they may be unique. In the illustrated examples, the legs 24, 26 are substantially identical in form having a V-shaped (i.e., boomerang-like) configuration. In the embodiment of FIGS. 1-3, the V-shape of the legs 24, 26 is slightly acute, whereas in FIGS. 4-8 the V-shape is slightly obtuse. Naturally, the acute and obtuse V-shapes are merely examples; alternative shapes and configurations for the legs 24, 26 are possible. The fixed 24 and floating 26 legs each have a captured end 28 and a compliant end 30. That is, the two splayed tips of the V-shapes for each of the fixed 24 and floating 26 legs are identified as the captured 28 and compliant 30 ends, respectively. The captured ends 28 are aligned with one another and pivotally connected or constrained about a common pivot axis to the mounting plate 22. This is perhaps best shown in FIG. 1, where a long bolt 32 is used to establish the pivotal connection between the captured ends 28 of the legs 24, 26 and the mounting plate 22.

The compliant ends 30 of the legs 24, 26 are also aligned with one another and pivotally connected about a common suspension axis, which is established by a suspension bolt 34 as shown in FIGS. 1 and 2. However, rather than being locked to the mounting plate 22 via a pivoting connection as with the captured ends 28, the compliant ends 30 of the legs 24, 26 are spring-suspended for enhanced wheel traction. A vertical suspension unit, generally indicated at 36, is operatively disposed between the aligned compliant ends 30 and the mounting plate 22 for this purpose. The vertical suspension unit 36, includes at least one spring or other form of resilient element that can yield under an impulse load yet restore its position after the impulse has subsided. Examples of a suitable vertical suspension unit 36 may be adapted from the hub component fitted inside the CasterShox® products offered by Caster Concepts, Inc. of Albion, Mich. For a detailed description of these hub components which may be deployed as a vertical suspension unit 36, reference is made to U.S. Pat. No. 7,478,803 issued Jan. 20, 2009 to Lee, an inventor of this present invention, the entire disclosure of which is hereby incorporated by reference and relied upon. The body of the vertical suspension unit 36 may be secured to the mounting plate 22 as by any suitable strap or bracket 38 (FIG. 1). The suspension bolt 34 is passed through the center of the vertical suspension unit 36 and coupled to the compliant ends 30 of the legs 24, 26. In this manner, the compliant ends 30 of the legs 24, 26 are both pivotally and linearly moveable relative to the mounting plate 22. When an impulse load is encountered, e.g., a bump in the ground surface, the vertical suspension unit 36 will yield, causing the compliant ends 30 of the legs 24, 26 to move vertically up or down together with the interconnecting suspension bolt 34. The captured ends 28 are then constrained to pivot (slightly) as the compliant ends 30 travel vertically.

An axle 40 passes perpendicularly through the fixed 24 and floating 26 legs, generally mid-way between the respective captured 28 and compliant 30 ends as shown in FIGS. 2 and 3. Returning to the descriptive V-shape attributed to the legs 24, 26, the axle 40 can be seen as intersecting near the central knee or point of convergence in the V-shape. Generous clearance holes are provided in the fixed 24 and floating 26 legs for accommodating the axle 40 to pass therethrough. The axle 40 is supported for horizontal rotation relative to the mounting plate 22 about a longitudinal axis A. A particularly keen aspect of this configuration is the placement of a self-aligning bearing 42 to operatively support the axle 40 in the floating leg 26. The self-aligning bearing 42 is largely insensitive to angular misalignment of the axle 40 relative to the floating leg 26, which means that a slight-to-moderate non-perpendicular relationship between the floating leg 26 and the longitudinal axis A will not impede performance. In some designs, the self-aligning bearing 42 may have two rows of rollers and a common sphered raceway in the outer ring. In other contemplated constructions, the self-aligning bearing 42 may have a single spherical plain bearing supported in a spherical outer ring. Other constructions may also be possible, with the objective to tolerate some degree of angular misalignment between the axle 40 and the floating leg 26. As shown in FIGS. 2 and 3, the self-aligning bearing 42 may be of the flange-type which can be easily fastened to the side of the floating leg 26 so as to rotatably support the axle 40 within the generous clearance hole formed therein. In this manner, the floating leg 26 is not required to be precisely perpendicularly aligned with respect to the axle 40, thereby making fabrication of the motorized wheel sub-assembly 16 substantially less expensive. A keeper 44 may be attached to the axle 40 on the outboard side of the self-aligning bearing 42 to hold the assembled components in position during use.

A drive wheel 46 is disposed on the axle 40 in-between the fixed 24 and floating 26 legs for locked rotation with the axle 40 about the longitudinal axis A. The drive wheel 46 may be any suitable type of caster wheel, preferably fitted with a polymeric tread for traction. In some cases, a specialty tread may be used, like for example a Mecanum wheel as when two or more motorized wheel sub-assemblies 16 are used in tandem. A splined or keyed connection may be used to couple the drive wheel 46 to the axle 40 for co-rotation, as may be discerned from FIG. 3. A thrust washer 48 may be fitted as a spacer in-between the drive wheel 46 and the self-aligning bearing 42. On the other side of the drive wheel 46, the axle 40 passes freely through the generous clearance hole in the fixed leg 24 without making contact. In this manner, the axle 40 is directly supported on one end by the floating leg 26 (via the self-aligning bearing 42) but its other end is not directly supported by the fixed leg 24. The fixed leg 24 does provide indirect support for the other end of the axle 40, as will be described immediately below.

A gearbox 50 is rigidly attached to the outboard side of the fixed leg 24 with threaded fasteners 52. See FIGS. 2 and 3. In order to provide operating clearance, it may be necessary in some applications to provide a hollow spacer 54 between the gearbox 50 and the fixed leg 24. A spacer 54 is shown in the illustrated examples, generally centered about the clearance hole and the longitudinal axis A. The threaded fasteners 52 are selected to be long enough to accommodate the axial width of the spacer 54. Inside the gearbox 50 is a right-angle gear train, a representative portion of which is indicated at 56 in FIG. 3. The right-angle gear train 50 may be configured in any suitable arrangement of gears, including worm, bevel, crown and helical types to name but a few. Regardless of the specific configuration of the gear components, the right-angle gear train 56 includes a hollow output shaft 58 disposed, at least partially, in the gearbox 50. The hollow output shaft 58 is supported in the gearbox 50 by at least one fixed bearing 60. Two fixed bearings 60 are visible in the exemplary cross-sectional view of FIG. 3. The axle 40 is operatively disposed inside the hollow output shaft 58 and coupled for synchronous co-rotation, as through a splined or keyed connection discernable from FIG. 3. That is, the hollow output shaft 58 and axle 40 and drive wheel 46 are all locked together as a rotational unit with bearing support provided via the self-aligning bearing 42 on one end and the fixed bearings 60 on the other end. Thus, the fixed leg 24 indirectly supports the end of the axle 40 via the fixed bearings 60 contained within the gearbox 50, which gearbox 50 is bolted to the fixed leg 24 via the (optional) spacer 54. From a manufacturing point of view, the fixed leg 24 and floating leg 26 do not need to be maintained in perfect parallelism, which greatly facilitates assembly. Furthermore, in use side loads may cause flexing or distortion of one leg 24 relative to the other leg 26. And yet, no ill effects are visited on the free spinning operation of the drive wheel 46 because the self-aligning bearing 42 easily accommodates shifting of the legs 24, 26. Another keeper 44 may be attached to the axle 40 on the outboard side of the gearbox 50 to hold the assembled components in position during use and, to some degree, help reduce flexure of the legs 24, 26.

An electric drive motor 62 is attached to the gearbox 50. Through an unseen motor shaft, the drive motor 62 is operatively coupled with the right-angle gear train 56 which results in forced rotation of the hollow output shaft 58 when energized. The electric drive motor 62 is preferably of the reversible type, enabling the hollow output shaft 58 to be rotated within its fixed bearings 60 either in a clockwise or counter-clockwise direction depending on the power signal received. In this way, the drive wheel 46 is power driven, by the drive motor 62, in either a forward or a rearward direction.

As mentioned previously, when the motorized wheel sub-assembly 16 is attached to the bottom of a utility cart or other wheeled material handling device, such that the drive wheel 46 makes contact with the ground substantially concurrently with the other caster wheels of the cart, the utility cart can be power driven and thereby reduce human worker effort needed to move the cart. Because the vertical suspension unit 36 is integrated between the legs 24, 26 and the mounting plate 22, traction is maintained even when the cart traverses uneven ground effects. And the somewhat imprecise mounting of the floating leg 26, enabled through the self-aligning bearing 42, not only makes the motorized wheel sub-assembly 16 less expensive to produce, but also more durable in operation as leg deflections caused by normal load-induced stresses will not bind against the free rotation of the axle 40.

Turning now to FIGS. 4-8, the lifter sub-assembly 18 will be described in detail. Although the lifter sub-assembly 18 may be deployed within the context of any number of different caster wheel strategies, including motorized and non-motorized (free-spinning) types, and fixed (non-steerable) and swivel (steerable) types, this aspect of the invention is very effective when operatively disposed in the motorized wheel sub-assembly 16 described above. FIGS. 4-8 illustrate a slightly modified form of the motorized wheel sub-assembly 16, with like or corresponding parts being identified with the same reference numbers for convenience. Such components common or substantially identical to those described above in connection with FIGS. 1-3 will not be described again even though their appearance may vary slightly from what was illustrated in the preceding embodiment.

The lifter sub-assembly 18 is integrated between the mounting plate 22 and either the captured ends 28 or the compliant ends 30 of the legs 24, 26. When activated, the lifter sub-assembly 18 causes a physical displacement between the longitudinal axis A and the mounting plate 22. As a result of this displacement, the longitudinal axis A is raised or lowered relative to the ground. The lifter sub-assembly 18 includes an actuator 64 that has a distal tip which is moveable between extended and retracted positions. The drive wheel 46 is pressed into contact with the ground when the actuator 64 is in the extended position, and the drive wheel 46 is lifted out of contact with the ground when the actuator 64 is in the retracted position. See FIGS. 6 and 7. The actuator 64 is preferably is of the linear type having an output motion similar in some respects to the armature of a solenoid motor, but may instead be configured with a rotary output or some other suitable type of motion. The distal tip forms the outermost driving end of the actuator 64 and moves back and forth along a linear path. The linear actuator 64 is shown in the extended position in FIGS. 4, 5 and 7, and in the retracted position in FIG. 6. A thrust motor 66 is drivingly connected to the linear actuator 64. The thrust motor 66 is activated to alternately move the linear actuator 64 back-and-forth between these extended and retracted positions, typically by induction or electro-magnetism or pneumatics or hydraulics. In some scenarios, the thrust motor 66 may be paired with a return spring (not shown) that continuously urges the linear actuator 64 toward the normally retracted position so that as a failsafe condition the drive wheel 46 is lifted out of contact with the ground. (Or perhaps in some cases the return spring could bias toward a normally extended position.) The thrust motor 66, in this example, is pivotally connected to the mounting plate 22 at pin 68. In other contemplated embodiments, the thrust motor 66 could be rigidly attached to (or relative to) the mounting plate 22, or attached by some other form of articulating connection as may be needed for proper motion control of the actuator 64.

Upper 70 and lower 72 links are pivotally attached to the distal end of the linear actuator 64. The upper link 70 is pivotally attached to the mounting plate 22. The lower link 72 is pivotally attached to either the captured 28 or complaint ends of the legs 24, 26, preferably through their respective bolts 32, 34. In the illustrated examples, the lifter sub-assembly 18 is integrated through the captured ends 28 of the legs 24. Those of skill in the art, however, will be able to envision the alternative configuration in which the lifter sub-assembly 18 is integrated through the compliant ends 30 of the legs 24, 26. In that non-illustrated variation, the vertical suspension unit 36 can either be placed in-between the upper link 70 and the mounting plate 22, or alternatively in-between the lower link 72 and the compliant ends 30 of the legs 24, 26. The upper 70 and lower 72 links are designed so as to form a generally vertical load-bearing column when the linear actuator 64 is in the extended position, as clearly see in FIGS. 6 and 7. In this manner, the optimal vertical load bearing capacity of the lifter sub-assembly 18 is achieved when the drive wheel 46 is deployed.

Naturally, the specific construction of links 70, 72 can be replaced with other types of mechanism to achieve a similar result. As an example, a sliding cam may be used instead of the links 70, 72 as documented in the earlier priority documents to this present patent application. Other mechanically-equivalent variations to the double links 70, 72 and/or sliding cam are also possible.

Turning now to FIGS. 9-13, the cart frame sub-assembly 20 will be described in detail. Although the cart frame 20 may be deployed within the context of any number of different lift-enabled motorized wheel configurations, this aspect of the invention is very effective when operatively joined with the combined motorized wheel and lifter sub-assemblies 16,18 described above. Components common or substantially identical to those described above in connection with FIGS. 1-8 will not be repeated, but are nevertheless fully applicable to the following Figures as well.

The cart frame 20 is representative of many different types of wheeled material handling devices. Such cart frames 20 can be general purpose wagons or designed for a special material handling application. The illustrated examples show a relatively simple, flat-bed type of cart frame 20 that can be alternately moved by hand and towed by a tractor, however those of skill in this industry will appreciate the vast variety of forms and applications for which the cart frame 20 might be otherwise configured. As perhaps best shown in FIG. 9, the cart frame 20 includes a platform 74 upon which cargo items (not shown) are placed for transport. In this example, the platform 74 has a generally planar (i.e., flat) top surface and an underlying bottom surface which is visible in FIG. 11. The platform 74 shown here is generally rectangular as defined by two opposing long side edges 76 and two opposing short ends 78. Corners are formed at the intersections of the short ends 78 and the long side edges 76. The drawings show the corners each being fitted with raised corner cleats 80 to help control against unwanted shifting of cargo during transport, however these are of course optional features.

The cart frame 20 preferably includes some form of handlebar 82. The handlebar 82 may take many different forms. In the illustrations, the handlebar 82 appears in a traditional, generally inverted U-shaped configuration attached to one of the short ends 78. It is expected that the horizontal portion of the handlebar 82 will be located at about the solar plexus level for the average user, who will at times use one or both hands to grasp and thus maneuver the cart frame 20 by force applied through the handlebar 82. In other contemplated embodiments, the handlebar 82 may be adjustable in height and/or angularity. The handlebar 82 could be T-shaped or located off-center. The cart frame 20 may include multiple handlebars 82, and possibly even none at all. Indeed, a wide range of different configurations of handlebar 82 are certainly possible, with the U-shaped design shown in the figures merely serving in a representative capacity.

Several caster wheels are attached to the bottom surface of the platform 74. The plurality of caster wheels preferably includes at least one, but more preferably at least two, swivel casters 84. The swivel casters 84 are steerable so that the direction of the cart frame 20 can be easily manipulated. Commonly, the swivel casters 84 will be located under the corners of the short end 78 to which the handlebar 82 is attached. That is, in many cases steering the cart frame 20 will be most convenient when the swivel casters 84 are located closest to the handlebar 82. However, there may be applications where the swivel casters 84 are preferred to be positioned differently underneath the platform 74. The plurality of caster wheels preferably includes at least one, but more preferably at least two, non-steerable caster wheels 86. These may be standard caster wheels made of metal with polymeric treads, or any other type suited to the application. In the depicted examples, two non-steerable caster wheels 86 are disposed remote from the handlebar 82. The two non-steerable caster wheels 86 are preferably co-axially aligned with one another. Fitting the cart frame 20 with two swivel casters 84 and two non-steerable casters 86 is common, as this arrangement gives the cart frame 20 a moderate blend of maneuverability and tracking stability. However, in some case it may be desirable that all of the caster wheels located under the platform 74 are of the swivel type 84, or alternatively in other cases that all of the caster wheels located under the platform 74 are of the non-steerable type 86.

The cart frame 20 is configured to be capable of manual manipulation by a human user and alternately slavishly towed behind a tractor (not shown). For times when the human user is maneuvering the cart frame 20, it may be helpful to provide a motorized assist by incorporating the motorized wheel and lifter sub-assemblies 16, 18 described above. The motorized wheel sub-assembly 16 enables forward and reverse power drive through the drive wheel 46. The lifter sub-assembly 18 allows the drive wheel 46 to be selectively raised out of contact with the ground, effectively disabling the motorized wheel sub-assembly 16 which would be helpful in some manual use situations and in almost all towed situations. Furthermore, when it is desired that the cart frame 20 remain immobile, the lifter sub-assembly 18 can be deployed to press the drive wheel 46 into contact with the ground, but with the non-energized drive motor 62 serving as a parking brake. The motorized wheel sub-assembly 16 could be located almost anywhere underneath the platform 74. However, there are certain benefits gained by positioning the drive wheel 46 in (near) coaxial alignment with the two non-steerable caster wheels 86, and generally mid-way between. That is, when the point of rolling contact for drive wheel 46 lies (generally) along and (generally) bisects the imaginary line passing through the points of rolling contact for the two non-steerable caster wheels 86, there are distinct advantages. In particular, when a human user is maneuvering the cart frame 20 and desires to make a yawing turn to the left or right, the point of rolling contact for drive wheel 46 will establish an imaginary a vertical turning axis that is equidistant from each of the non-steerable caster wheels 86 about which the cart frame 20 will turn. At the same time, the drive motor 62 will be forcibly rotating the drive wheel 46, which will give the user maximum control over the cart frame 20. Enhanced user control leads to fewer unintended collisions and less stress on the worker's body muscles, i.e., fewer injuries.

Figure 9:
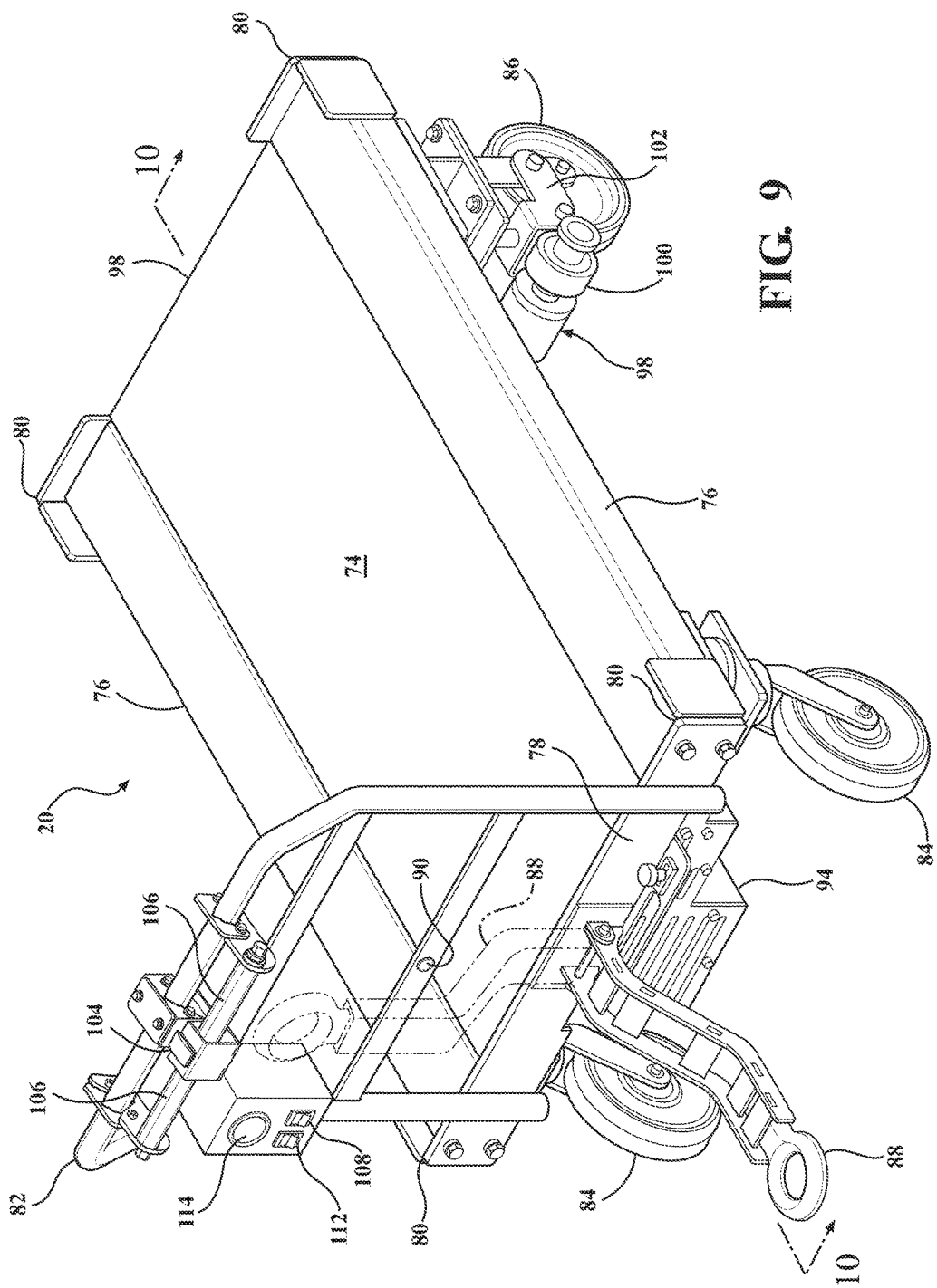
FIG. 9 is a perspective view of a cart frame according to a third aspect of this invention.
Figure 10:
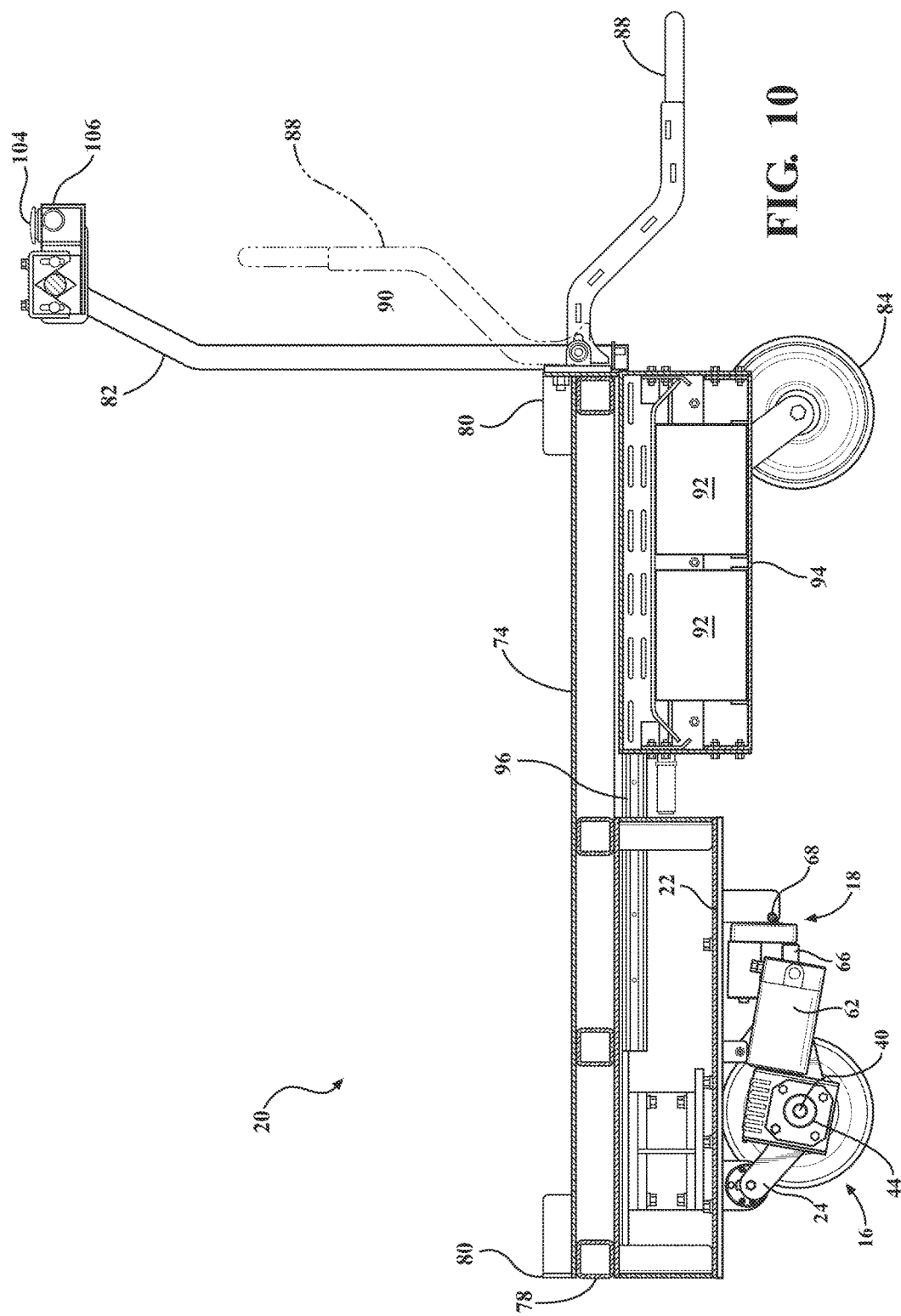
FIG. 10 is a cross-section view taken generally along lines 10-10 in FIG. 9, and which reveal the integration of the assembly depicted in FIGS. 4-7 along with the location of the on-board battery power source.
Figure 11:
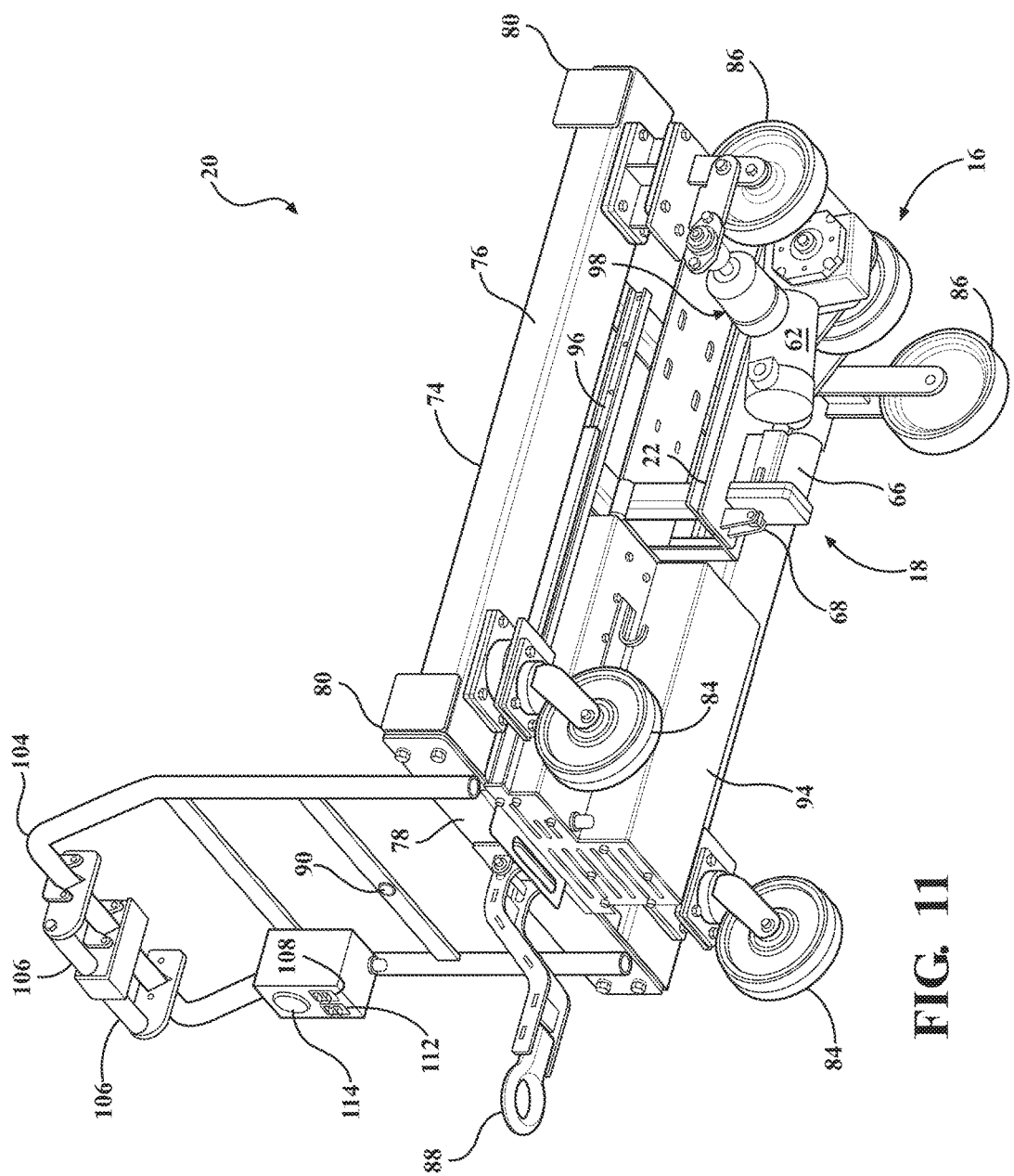
FIG. 11 is a perspective view displaying the under-side of the cart frame of FIG. 9.

FIG. 9-11 show only a single lift-enabled motorized wheel sub-assembly 16, 18 fitted to the bottom of the platform 74, in-line between the two non-steerable caster wheels 86. It is entirely possible that two lift-enabled motorized wheel sub-assemblies 16, 18 could be used in tandem for increased motive power and/or maneuverability. If two such lift-enabled motorized wheel sub-assemblies 16, 18 are placed so as to co-axially align their respective longitudinal axes A, then it may be advantageous to gang together their lifter sub-assemblies 18 to raise and lower the two drive wheels 46 in unison. Having two (or more) lift-enabled motorized wheel sub-assemblies 16, 18 presents several advantages. Naturally, motive power is increased. However, if the drive motors 62 are separately controllable, the respective drive wheels 46 can be turned at different speeds or in different directions to help move turn and maneuver the cart frame 20. If multiple sets of ganged motorized wheel sub-assemblies 16 (i.e., four or more) fitted to the bottom of the platform 74, the treads of the respective drive wheels 46 could be fashioned as Mecanum wheels, for example, to provide an exceptionally high degree of motorized maneuverability.

A tow-bar 88 may be operatively attached to the platform 74 to facilitate pulling the cart frame 20 behind a tractor (not shown). The tow-bar 88 may take many different forms. In the examples illustrated in the accompanying figures, the tow-bar 88 is pivotally joined to the platform 74 below the handlebar 82. The pivotal connection allows the tow-bar 88 to be moved between two positions—namely a raised position in which the tow-bar 88 is stowed, and a lowered position in which the tow-bar 88 is active. In FIGS. 9 and 10, for example, the tow-bar 88 is depicted in solid lines in its lowered position. In these same views, the raised position of the tow-bar 88 is illustrated in phantom lines. The arc of pivoting movement in these examples is about 90 degrees.

Figure 13:
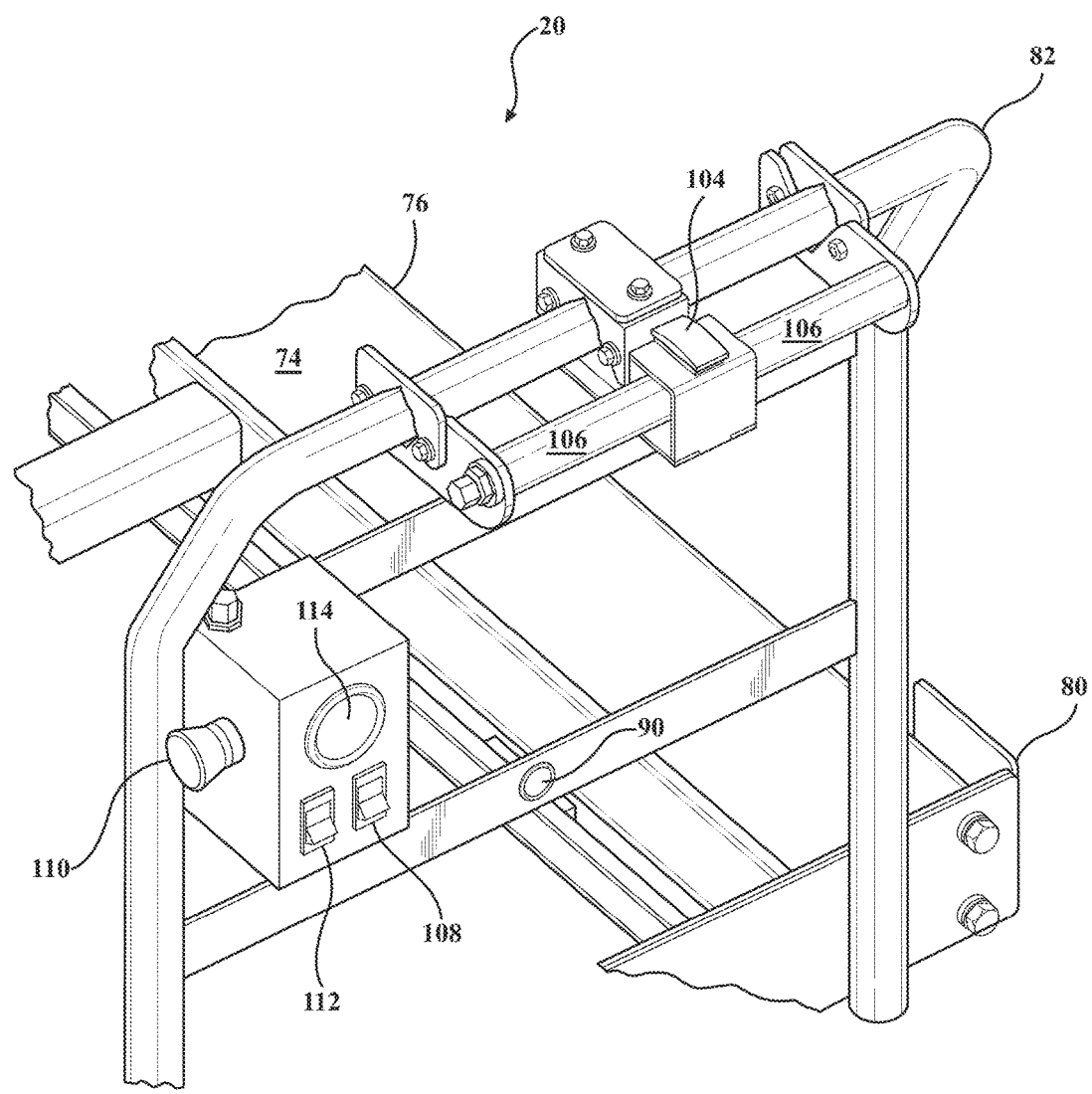
FIG. 13 is an enlarged view showing the remote-control instrument cluster as mounted on the handlebar.

As stated previously, in most contemplated towing situations, it is desired that the drive wheel 46 be lifted out of contact with the ground so as not to impose unnecessary drag or wear on the components of the motorized wheel sub-assembly 16. (One example of an exception might arise if the motorized wheel sub-assembly 16 were configured to generate electricity for a rechargeable battery while being towed.) In the more common scenarios, however, the cart frame 20 may be outfitted with a tow bar switch 90 that is operatively connected to the thrust motor 66 of the lifter sub-assembly 18. The tow bar switch 90 would be responsive to movement of the tow-bar 88 to automatically cause the linear actuator 64 to move to the retracted position (FIG. 6) when the tow-bar 88 is in the lowered position. When the tow-bar 88 is in the raised position, the lifter sub-assembly 18 is free to move the drive wheel 46 up and down as may be required by the user. That is to say, when the tow bar 88 is raised, the user may or may not wish to utilize the motorized driving properties. If the user wants to take advantage of the motorized driving properties, they will cause the lifter sub-assembly 18 to move its linear actuator 64 to the extended position (FIG. 7) and engage the drive wheel 46 with the ground. However, the tow bar switch 90 automatically assures that the drive wheel 46 is lifted out of contact with the ground (as in FIG. 6) when the cart frame 20 is being towed, because the tow bar 88 will always be in the lowered position during towing. The tow bar switch 90 can be located at any suitable place, and can be fashioned from any suitable type of switch. FIGS. 9, 11 and 13 depict the tow bar switch 90 in the form of a proximity sensor that is located on a horizontal cross-brace of the handlebar 88. Other configurations are of course possible.

The drive motor 62 and thrust motor 66 can be of types energized by any number of different sources, including electrical energy, compressed air and hydraulics to name three commonly employed in industrial settings. In the case of the preferred embodiments, the drive motor 62 and thrust motor 66 are electrically powered from an on-board rechargeable battery power source 92, which may be housed within an electronics enclosure 94 located underneath the platform 74. Depending on the available battery technology, multiple battery power sources 92 may be required to fulfill a suitable in-service timeframe. In FIG. 10, two battery power sources 92 are shown, and may be connected in series or parallel depending on the need. In other configurations, the electronics enclosure 94 could be attached to the handlebar 82 or perhaps occupy some other placement on the cart frame 20. In the illustrated example, the electronics enclosure 94 is conveniently suspended from slides 96 (see FIGS. 10 and 11) like a pull-out drawer to enable easy access to its interior spaces for service. The battery power source 92 includes a plug-in recharging connector to recharge the battery power source 92 while the cart frame 20 is temporarily out of service, such as overnight or during specified shifts.

The cart frame 20 preferably includes an electric regeneration unit, generally indicated at 98. The electric regeneration unit 98 is operatively coupled to one of the caster wheels 84, 86. The electric regeneration unit 98 includes a rotary generator that is responsive to rotational inputs to generate and transmit an electrical current to the battery power source 92. As mentioned earlier, the electric regeneration unit 98 could possibly be a dynamic function of the motorized wheel sub-assembly 16. In another contemplated embodiment, the electric regeneration unit 98 could be configured to collect static electricity from the rolling caster wheels 84 and/or 86 if, for example, the casters 84, 86 are manufactured of a suitable elastomeric material that will naturally generate electrostatic energy when rolled along the floor. According to the principle of the van de Graff generator, the electrostatic charge is capable of producing high voltage, direct current electricity. Such a van de Graff generator equipped in the cart frame 20 would convert the electrostatic energy from the wheels 84, 86 to electricity, which can be collected in a suitable capacitor. When the capacitor is fully charged, the electronic circuitry will discharge the capacitor to recharge the battery power source 92.

Figure 12:
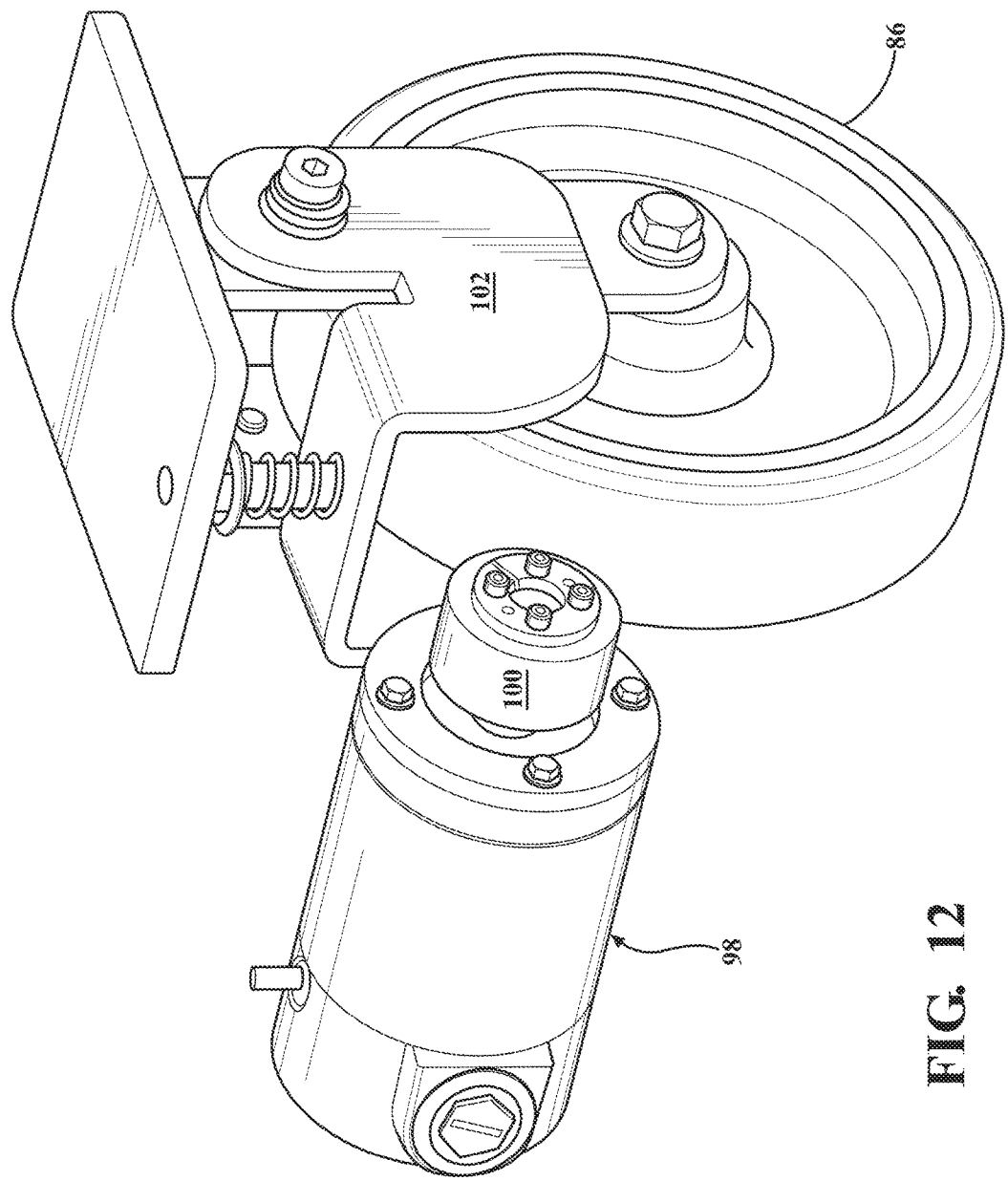
FIG. 12 is an enlarged view of the electric regeneration unit.

However, in the illustrated embodiment the electric regeneration unit 98 is configured as an independent generator as best shown in FIG. 12. The electric regeneration unit 98 in this example is coupled to one rear (non-steerable) caster wheel 86 to create electricity as the wheel 86 turns. An idler wheel 100 is disposed in perpetual rolling engagement with one of the non-steerable caster wheels 86. See FIG. 12. A spring-suspension bracket 102 connected to the rotary generator applies resilient pressure onto the non-steerable caster wheel 86 from the idler wheel 100. The idler wheel 100, in turn, is attached to the input shaft of a small rotary electrical generator which is a part of the electric regeneration unit 98. Wires (not shown) electrically connect the generator to rechargeable battery power source 92. Preferably, the electronic control system is designed to not permit a current draw to recharge the battery 92 until the current reaches a threshold value. Ideally, the threshold value is set to be reached with the cart frame 20 is pulled at higher speeds by a tractor, but not at low speeds such as when being manually maneuvered. In this way, less resistance will be asserted against the affected caster wheel 86 by the idler wheel 100 at low speeds when a human worker it pushing or pulling the cart frame 20. However, when a tractor is pulling the cart frame 20 at higher speeds, and typically for longer distances, regenerative charging of the battery 92 will occur. Those of skill in the art might envision other alternative arrangements with respect to the use of one or more independent generators to implement a self-charging system in combination with the cart frame 20.

FIG. 13 offers a close-up view of a remote-control instrument cluster which includes controls accessed by a user to actuate the features of the motorized wheel sub-assembly 16 and the lifter sub-assembly 18. Of course, the arrangement and content of the remote-control cluster is subject to wide variations and design choices. Among the user-accessed controls in the remote-control instrument cluster is a forward-reverse switch 104. The forward-reverse switch 104 may be mounted in any convenient location for activating the drive motor 62 and controlling its rotary direction. The forward-reverse switch 104 is shown for illustrative purposes in the form of a toggle attached to an outrigger handgrip 106, however in the alternative a joystick or slide bar or other type control device may be used. When the user depresses the top or foremost part of the forward-reverse switch 104, the drive motor 62 is energized to turn the drive wheel 46 in a direction so as to move the cart frame 20 in a forward direction. Conversely, when the user depresses the bottom or rearmost part of the forward-reverse switch 104, the drive motor 62 is energized to turn the drive wheel 46 in an opposite rotary direction so as to move the cart frame 20 rearwardly. In this example, the control circuitry is configured to operate the drive motor 62 at a safe constant slow speed. In other contemplated embodiments, a throttle control may be included, such as possibly in the form of a twist grip portion of the outrigger handgrip 106, to enable a degree of speed control. Many variations are possible. The remote-control instrument cluster also includes a lift switch 108 that is operatively connected to the thrust motor 66 of the lifter sub-assembly 18 for moving the linear actuator 64 between its extended and retracted positions. With this lift switch 108, a user can choose when to raise and lower the drive wheel 46. As mentioned above, the tow bar switch 90 can function as an over-ride to this lift switch 108, such that drive wheel 46 will be lifted out of contact with the ground when the tow bar 88 is lowered no matter what position the lift switch 108 is in. The remote-control instrument cluster may also include an emergency kill switch 110 that enables a user to quickly kill power to the drive motor 62. A power ON/OFF switch 112 is shown next to the lift switch 108. The remote-control instrument cluster may also include a battery power source meter 114 or indicator lights to monitor the charge status of the battery 92. Certainly, additional features can be added if more functionality and/or control is desired.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, features of one embodiment can replace corresponding features in another embodiment or can supplement other embodiments unless otherwise indicated by the drawings or this specification.

What is claimed is:

1. A lift-enabled motorized wheel assembly for a material handling cart, said assembly comprising:
    a mounting plate,
    a pair of legs extending perpendicularly from said mounting plate, said pair of legs comprising a fixed leg and a floating leg spaced laterally apart from one another, each said fixed and floating leg extending between respective captured and compliant ends, said captured ends being aligned with one another and pivotally connected about a common pivot axis to said mounting plate, said compliant ends being aligned with one another and pivotally connected about a common suspension axis,
    an axle perpendicularly intersecting said legs between said respective captured and compliant ends, said axle supported for rotation relative to said mounting plate about a generally horizontal longitudinal axis thereof,
    a drive wheel disposed on said axle in-between said legs for locked rotation with said axle about said longitudinal axis,
    a drive motor operatively coupled to said axle for co-rotating said axle and said drive wheel about said longitudinal axis,
    a lifter sub-assembly operatively disposed between said mounting plate and one of said captured and compliant ends of said fixed and floating legs, said lifter sub-assembly including an actuator moveable between extended and retracted positions, whereby said drive wheel is pressed into contact with the ground when said actuator is in the extended position and said drive wheel is lifted out of contact with the ground when said actuator is in the retracted position, said actuator having a distal end, upper and lower links pivotally attached to said distal end of said actuator, said upper link pivotally attached to said mounting plate, said lower link pivotally attached to said captured ends of said fixed and floating legs, said upper and lower links forming a generally vertical load-bearing column when said actuator is in said extended position,
    a self-aligning bearing operatively supporting said axle in said floating leg, and a clearance hole in said fixed leg for accommodating said axle to pass therethrough.

2. The assembly of claim 1 wherein said lifter sub-assembly includes a thrust motor drivingly connected to said actuator to alternately move said actuator back-and-forth between said extended and retracted positions.

3. The assembly of claim 2 wherein said thrust motor is pivotally connected to said mounting plate.

4. The assembly of claim 1 further including a vertical suspension unit operatively disposed between said aligned compliant ends and said mounting plate.

5. The assembly of claim 4 wherein said vertical suspension unit is disposed in-between said upper link and said mounting plate.

6. The assembly of claim 4 wherein said vertical suspension unit is disposed in-between said lower link and said compliant ends of said fixed and floating legs.

7. The assembly of claim 1 further including a gearbox rigidly attached to said fixed leg, said gearbox comprising a right-angle gear train operatively disposed therein, said right-angle gear train including a hollow output shaft disposed at least partially in said gearbox, said hollow output shaft supported in said gearbox by at least one fixed bearing, said axle operatively disposed inside said hollow shaft for synchronous co-rotation.

8. The assembly of claim 7 further including a hollow spacer generally centered about said clearance hole and disposed in-between said gearbox and said fixed leg.

* * * * *